United States Patent [19]

Umetsu

[11] Patent Number: 5,337,107
[45] Date of Patent: Aug. 9, 1994

[54] PREPARATORY WINDING TYPE CAMERA

[75] Inventor: Takao Umetsu, Omiya, Japan

[73] Assignee: Fuji Photo Optical Co., Ltd., Saitama, Japan

[21] Appl. No.: 104,549

[22] Filed: Aug. 11, 1993

[30] Foreign Application Priority Data

Aug. 13, 1992 [JP] Japan .................. 4-216112

[51] Int. Cl.$^5$ .................. G03B 1/18; G03B 17/36
[52] U.S. Cl. .................. 354/173.1; 354/173.11; 354/217
[58] Field of Search .................. 354/173.1, 173.11, 217, 354/475

[56] References Cited

U.S. PATENT DOCUMENTS

| | | | |
|---|---|---|---|
| 4,676,621 | 6/1987 | Malloy Desormeaux | 354/173.1 |
| 4,885,599 | 12/1989 | Goto et al. | 354/173.11 |
| 4,910,543 | 3/1990 | Kawamura et al. | 354/173.1 |

Primary Examiner—Michael L. Gellner
Assistant Examiner—Nicholas T. Tuccillo
Attorney, Agent, or Firm—Oliff & Berridge

[57] ABSTRACT

A preparatory winding type camera wherein one frame is rewound after the whole film in the patrone is previously wound up, and thereafter, the film is automatically rewound into a patrone frame after frame each time a shutter release is performed. During the winding of the film at the time of the preparatory winding processing, a central processing unit causes a liquid crystal display device (LCD) to display the number of film frames always smaller one frame than the normal display, and, when one frame is rewound after the whole film in the patrone is wound up, the number of film frames currently displayed on the LCD is maintained as it is. With this arrangement, the number of film frames displayed on the LCD can avoid the up-down fluctuations during the preparatory winding processing.

2 Claims, 6 Drawing Sheets

PREPARATORY WINDING TYPE CAMERA

BACKGROUND OF THE INVENTION

1. Field of the Invention

This invention relates to a camera, and more particularly to a so-called preparatory winding type camera wherein, after a film as a whole in a patrone is previously wound up, one frame of the film is automatically delivered each time a shutter release is performed.

2. Description of the Related Art

The preparatory winding type camera of this type has previously been constructed in such a way that, after the whole film in the patrone is previously wound up, one frame is rewound, and one frame is rewound each time the shutter release is performed after the completion of the preparatory winding.

Furthermore, after the film in the patrone is wound up for a photographing prohibiting region ("S" of the film) during the preparatory winding processing, the number of film frames is counted up each time one frame is wound, and counted down each time one frame is rewound.

Figure 6:
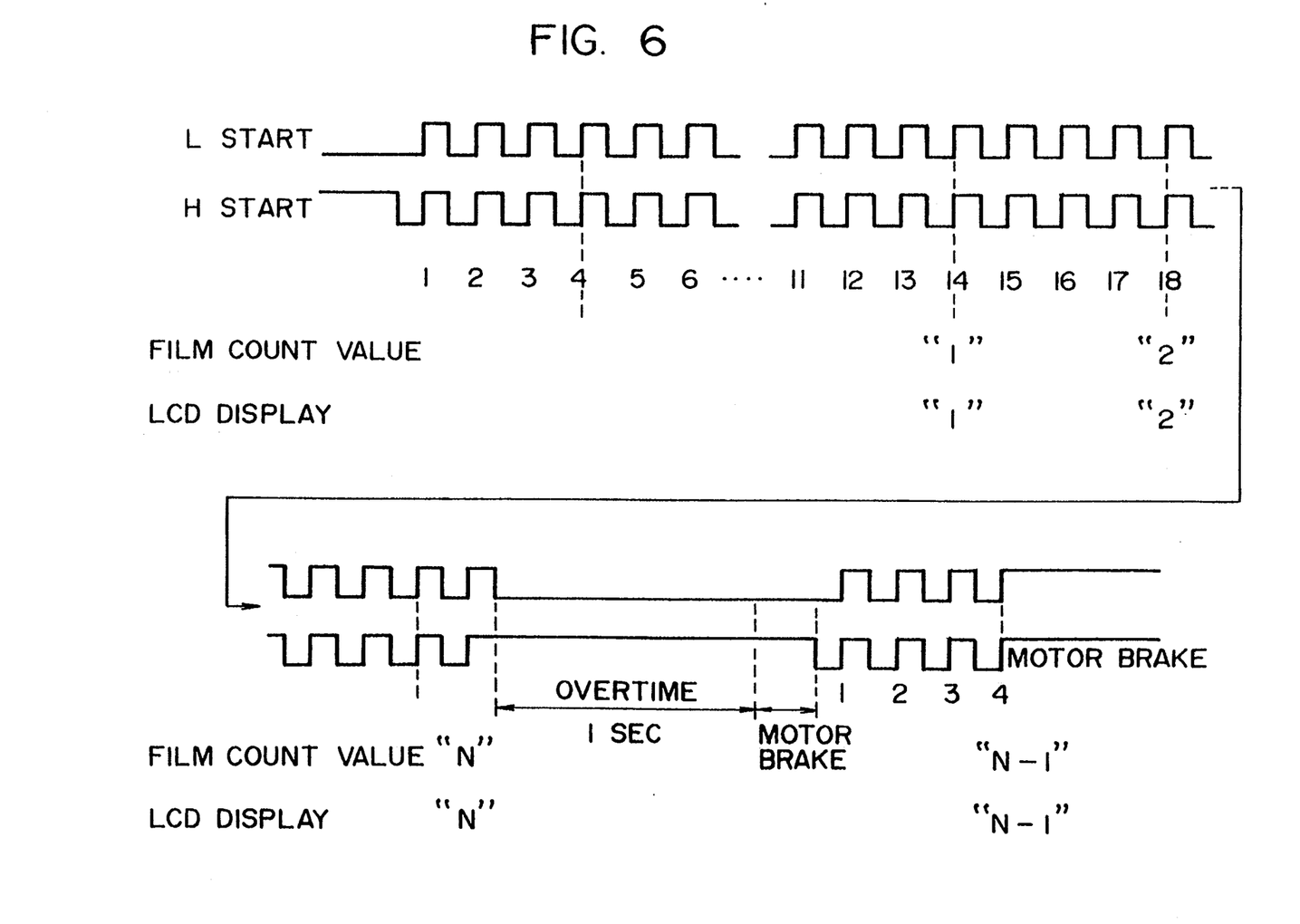

That is, during the preparatory winding processing, a motor for the film delivery is rotated in a direction of the preparatory winding ( normal rotation ), whereby the film winding is started. With this operation, a free sprocket interlocking with perforations of the film is rotated and, due to this rotation, pulse signals SO (pulse signals outputted by four pulses per film frame delivery) are generated. When the SO count value of the pulse signals SO reaches 14 as shown in FIG. 6, the count value of a film counter is counted up to "1", and thereafter, each time the SO count value is increased by four (each time one frame is wound), the film count value is counted up. Then, when the pulse signals SO are not generated by four pulses for a predetermined time (one sec.), it is judged that the film is wound up as a whole, whereby braking is applied to the motor for the film delivery. Subsequently, the motor for the film delivery is rotated reversely, whereby one frame is rewound, thus ending the preparatory winding processing. With this operation, the film count value becomes "N−1".

Thereafter, one frame of the film is rewound each time the shutter release is performed, and the film count value is counted down per frame delivery. Then, when the count value reaches "0", it is determined that photographing by the whole film is completed, and one frame delivery operation is continued, whereby the film rewinding is performed.

Incidentally, a liquid crystal display device (LCD) for displaying the number of film frames which can be photographed displays the film count value as it is.

Now, the reason why the film is rewound by one frame during the preparatory winding processing as described above resides in that such a disadvantage is eliminated that a portion of the film is cut away by laboratory equipment. During this rewinding, the film counter is counted down, whereby the number of film frames, which is displayed on the LCD is changed in display. As the result, the display of the film frames during the preparatory winding processing is subjected to up-down fluctuations, so that a lot of confusion has been given to users by the up-down fluctuations.

SUMMARY OF THE INVENTION

The present invention has been developed to eliminate the above-described disadvantages and has as its object the provision of a preparatory winding type camera wherein the display of film frames can be performed without being subjected to the up-down fluctuations during the preparatory winding processing, and moreover, the same number of film frames which taken as before can be secured.

To achieve the above-described object, the preparatory winding type camera according to the present invention is characterized by comprising:

a film delivery means for electrically performing the film delivery;

a film delivery control means for controlling the film delivery means in such a manner that one frame is rewound after the whole film in a patrone is wound up during the preparatory winding processing and one frame is rewound each time a shutter release is performed after the completion of the preparatory winding;

a film counter adapted to be counted up each time one frame is wound after the film in the patrone is wound by a photographing prohibiting region during the preparatory winding processing and to be counted down each time one frame is rewound;

a display means for displaying the number of film frames on the basis of the count value in the film counter; and a control means for controlling the display means in such a manner that a value smaller by one than the count value is displayed as the number of film frames at the time of count-up in the film counter during the preparatory winding processing and the display of the number of film frames is maintained as it is at the time of rewinding by one frame during the preparatory winding processing.

Furthermore, the preparatory winding type camera according to the present invention is characterized by comprising:

a film delivery means for electrically performing the film delivery;

a film delivery control means for controlling the film delivery means in such a manner that one frame is rewound after the whole film in the patrone is wound up during the preparatory winding processing and one frame is rewound each time the shutter release is performed after the completion of the preparatory winding;

a film counter adapted to be counted up each time one frame is wound after the film in the patrone is wound by one frame more than the photographing prohibiting region during the preparatory winding processing and to be counted down each time one frame is rewound;

a display means for displaying the count value in the film counter as the number of film frames which can be photographed; and a control means for controlling the film counter in such a manner that count-down in the film counter is prohibited only when one frame is rewound during the preparatory winding processing.

According to the present invention, during the film winding at the time of the preparatory winding processing, the number of film frame is always smaller by one than the count value in the film counter is displayed in the display means, and, when one frame is rewound after the whole film in the patrone is wound up, the count value in the film counter is counted down, while, the display of the number of film frames are maintained as it is. With this operation, the count value is made to coincide with the number of film frames and it avoides that the number of film frames displayed in the display means so that the preparatory winding processing is not subjected to the up-down fluctuations.

Furthermore, according to another mode of the present invention, during the film winding at the time of the preparatory winding processing, the count number in the film counter is made to be number alwayas smaller by one, and, when one frame is rewound after the whole film in the patrone is wound up, the count value in the film counter is prevented from being counted down. Furthermore, the count value in the film counter is displayed on the display means as it is as the number of film frames which can be photographed. With this operation, the number of film frames displayed on the display means during the preparatory winding processing is not subjected to the up-down fluctuations.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION ON OF THE PREFERRED EMBODIMENTS

Detailed description will hereunder be given of the preferred embodiments of the preparatory winding type camera according to the present invention with reference to the accompanying drawings.

Figure 1:
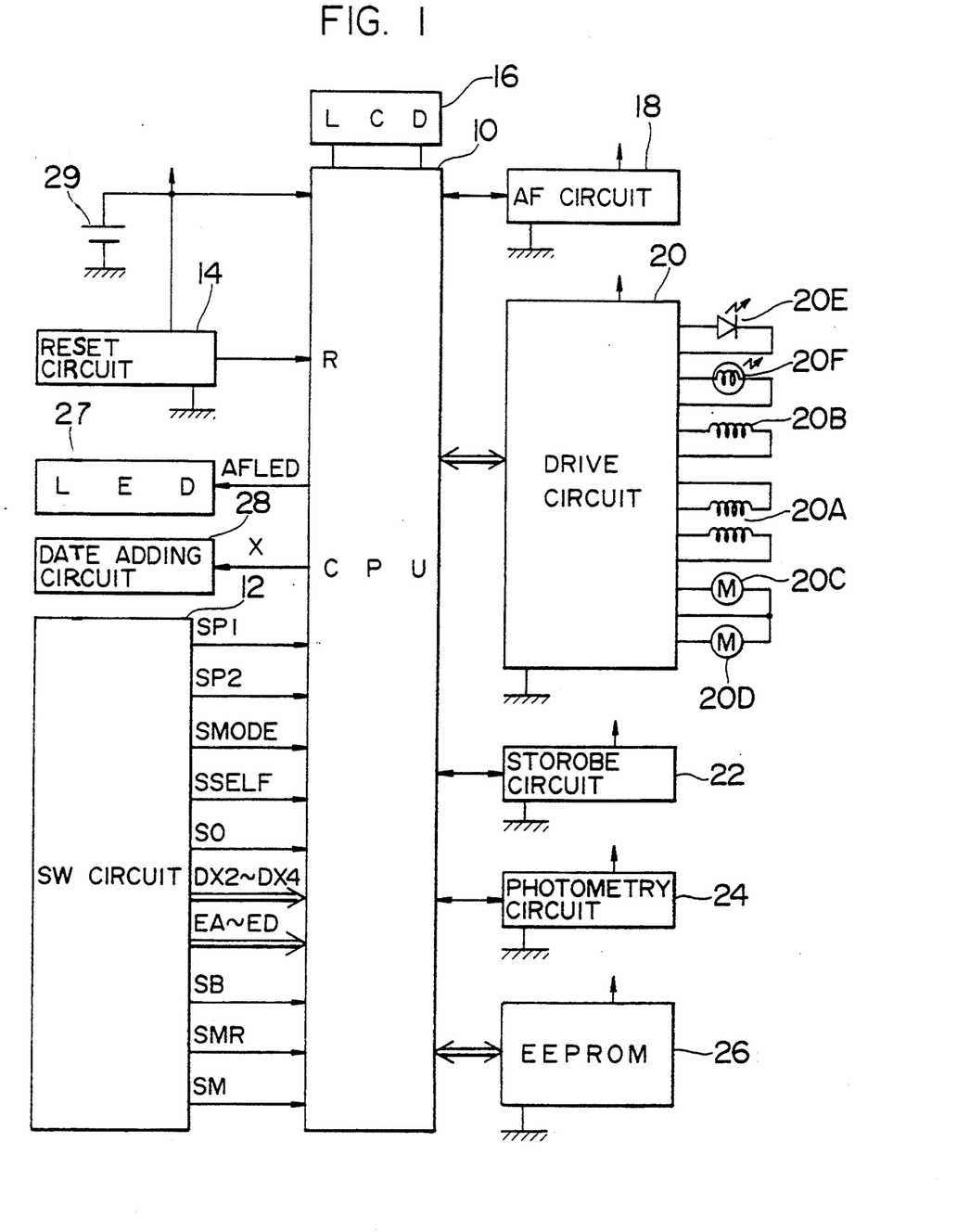
FIG. 1 is a block diagram showing one embodiment of the control section of the preparatory winding type camera according to the present invention.

FIG. 1 is the block diagram showing one embodiment of the control section of the preparatory winding type camera according to the present invention. In this preparatory winding type camera, the whole film in the patrone is previously wound up, and thereafter, the film delivery is performed in such that the film is automatically wound frame after frame each time the shutter release is performed.

As shown in FIG. 1, the control section of this preparatory winding type camera mainly includes: a central processing unit (CPU) 10; a switch circuit 12; a reset circuit 14; a liquid crystal display device (LCD) 16; an autofocus (AF) circuit 18; a drive circuit 20; a strobe circuit 22; a photometry circuit 24; an electrically erasable/programmable read-only memory (hereafter referred to as an "EEPROM") and the like.

The switch circuits 12 is adapted to output signals from various switches into the CPU 10, and the contents of the respective signals are as follows.

SP1: a signal showing whether a shutter release button is half-pressed or not

SP2: a signal showing whether the shutter release button is fully pressed or not SMODE: a signal showing whether the strobe mode is selected or not SSELF: a signal showing whether a self photographing mode is selected or not SO: pulse signals from one frame switch, which are outputted by four pulses per frame of the film delivery amount DX2~DX4: data showing the film sensitivity (ISO)

EA~ED: positional data from an encoder, showing states of a photographing optical system such as telescopic, wide, macro and the like SB: a signal from a rear lid switch SMR: a signal from an rewinding switch SM: a signal from a main switch The reset circuit 14 outputs a reset signal into the CPU 10 when the voltage of a battery 28 for supplying the power to the respective circuits is lowered to a level less than a predetermined one or when the battery is removed. The LCD 16 displays the number of film frames from the CPU 10, the number of film frames determined on the basis of data showing the contents of the camera operation, the contents of the camera operation and so forth.

The AF circuit 18 is adapted to measure a distance to an object by the trigonometrical survey, and, when the shutter release button is half-pressed to apply thereto a survey command from the CPU 10, the AF circuit 18 performs the trigonometrical survey and outputs the result of survey into the CPU 10.

The drive circuit 20 drives a stepping motor 20A for controlling the shutter and exposure, a magnet 20B, a motor 20C for the film delivery, a motor 20D for moving lenses and so forth in response to control signals from the CPU 10, and controls a self LED 20E for self photographing and a preparatory winding lamp 20F in a manner to turn the lights on or off.

The strobe circuit 22 is charged during the strobe photographing, and, when a flash signal from the CPU 10 is inputted thereinto at a predetermined timing in association with the shutter release, the strobe circuit 22 makes the strobe flash. Furthermore, the photometry circuit 24 measures the brightness of the object, and, when the shutter release button is half-pressed to apply a photometric command thereto from the CPU 10, the photometry circuit 24 outputs a signal showing the brightness of the object at the time into the CPU 10.

The EEPROM 26 stores and holds information of various types of the camera not to be lost even when the CPU 10 is reset by the reset circuit 14, and the EEPROM stores the information of the camera operations during the preparatory winding of the film, during one frame delivery, during the rewinding, during the standby and so forth, and the number of film frames.

That is, the CPU 10 writes into the EEPROM 26 the states of the camera operations showing the state of the preparatory winding, state of the film delivery frame after frame or state of rewinding immediately before driving the motor 20C for the film delivery through the drive circuit 20, and writes into the EEPROM 26 the state of the camera operation showing the state of standby immediately after the preparatory winding or one frame delivery is completed and the motor 20C for the film delivery is stopped. Furthermore, the CPU 10 includes a film counter for counting the number of film frames and writes into the EEPROM 26 the count value (number of film frames) at a timing when the count value of this film counter changes.

Then, after being reset by the reset circuit 14, the CPU 10 reads out the information of the camera operation and the number of film frames from the EEPROM 26 during the initial processing after the battery exchange, and continues to perform the camera operation when the reset is made.

Incidentally, the preparatory winding is started when it is detected that the rear lid is switched from "open" to "close" in response to the signal SB from the rear 1 id switch in the state where there is no film count. Furthermore, one frame delivery is performed after the shutter is normally released, and the manual rewinding is performed when the number of film frames is one or thereabove and the rewinding switch is turned on in response to the signal SMR from the rewinding switch or when the rear lid is mistakenly opened and closed again. This rewinding processing can be considered to be one frame delivery being continued. Further, designated at 27 is a LED to be turned on in response to a signal AFLED outputted from the CPU 10 upon completion of the tigonometrical survey, and 28 is a date adding circuit for performing the date adding operation in response to a signal X outputted from the CPU !0 in synchronism with the operation of the shutter release.

One embodiment of the preparatory winding processing will hereunder be described.

Figure 2:
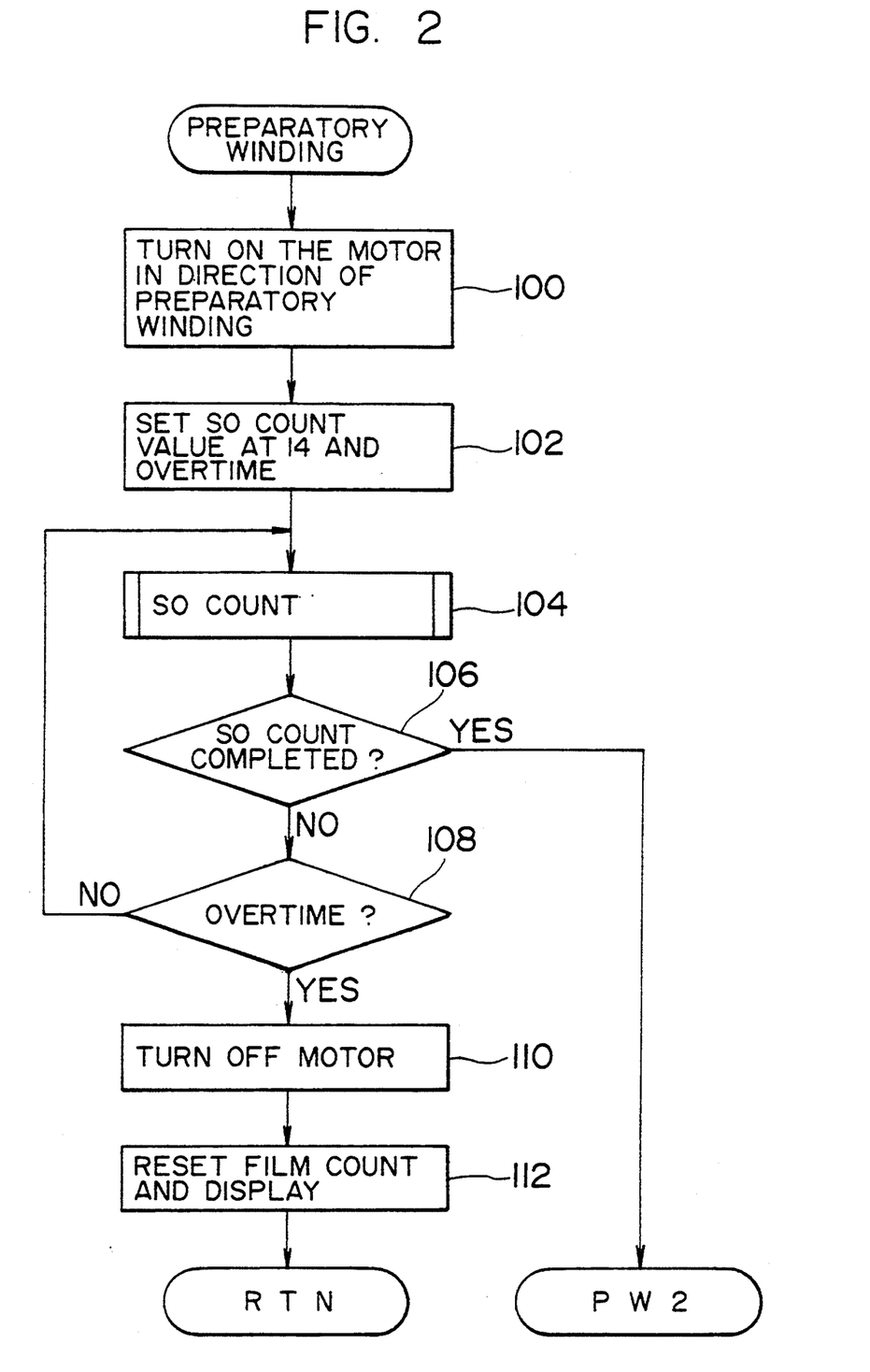
FIG. 2 is a flow chart used for explaining the preparatory winding processing.
Figure 3:
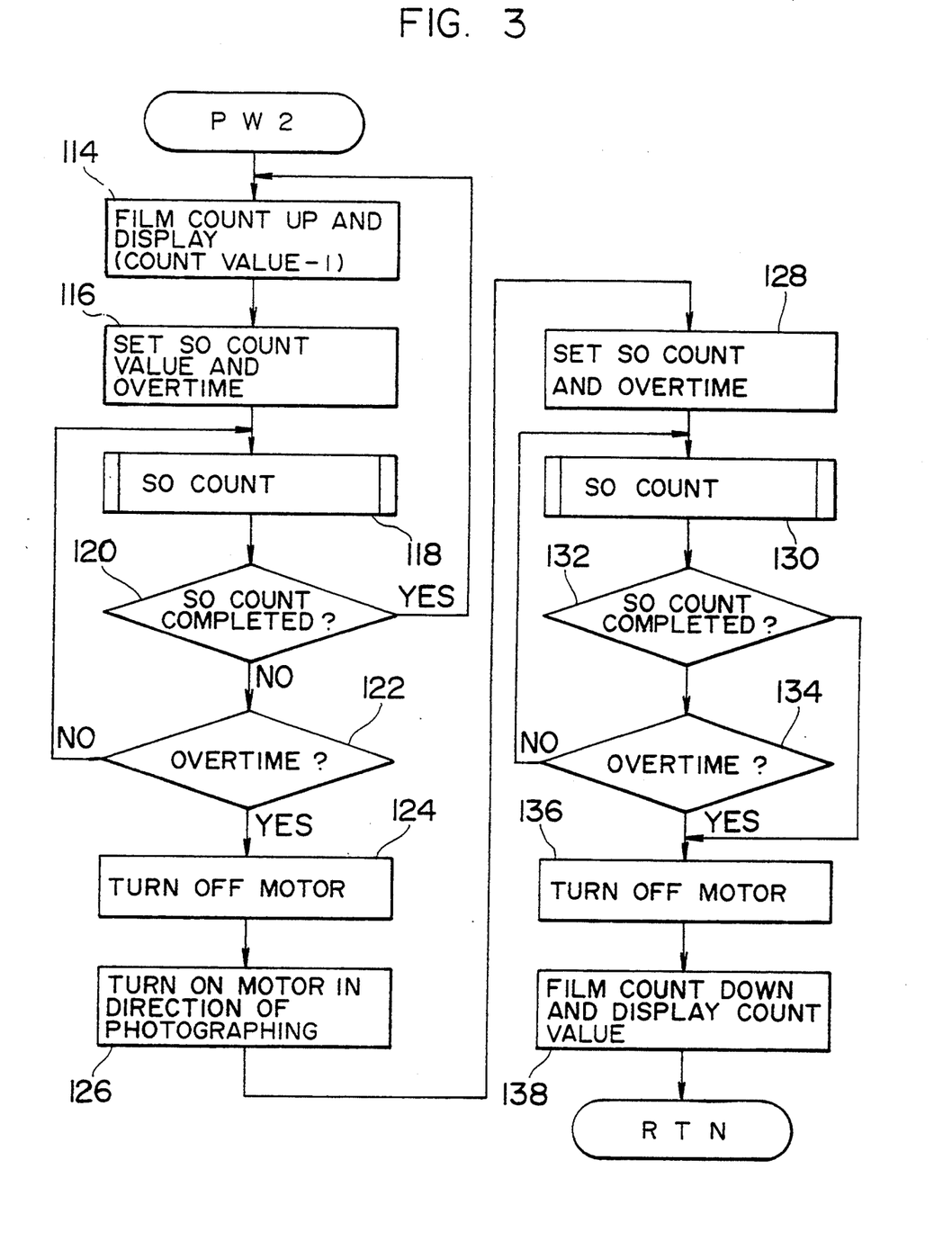
FIG. 3 is a flow chart used for explaining the preparatory winding processing.

Upon detecting that the rear lid is switched from "open" to "close" in response to the signal SB from the rear lid switch in the state where there is no film count, the CPU 10 performs the preparatory winding processing shown in the flow chart in FIGS. 2 and 3.

At the first step, the motor 20C for the film delivery is rotated in the direction of the preparatory winding, the winding of the film in the patrone is started (Step 100), simultaneously, the count value of the pulse signals SO generated due to the movement of the film is set at 14, and a predetermined overtime is set (Step 102).

Then, the pulse signals SO generated due to the movement of the film are counted (Step 104), and it is judged whether the count of the pulse signals SO is completed or not (whether the count value has reached 14 or not) (Step 106). When the count value does not reach 14, it is judged whether the overtime stands or not (Step 108), and, when the overtime does not stand, the routine returns to Step 104. On the other hand, when the count value has reached 14, the routine is transferred to the processing of the flow chart shown in FIG. 3. Incidentally, when the overtime stands in Step 108, the motor 20C for the film delivery is stopped (Step 110), and LCD displays of the film count and the number of film frames are reset (Step 112).

Figure 4:
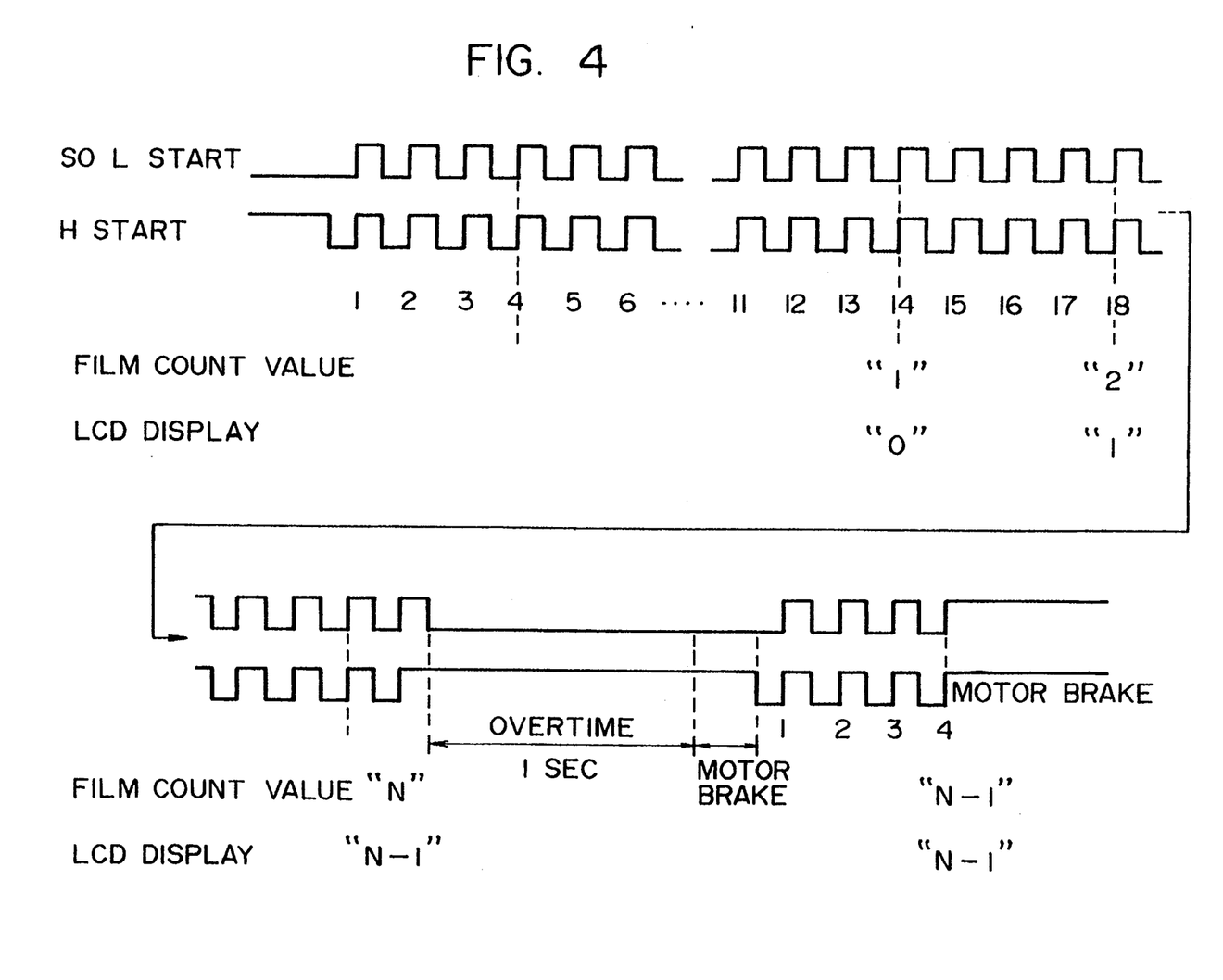
FIG. 4 is a view showing one embodiment of the relationship between the pulse signals SO, the film count value and the LCD display according to the present invention.

Now, when the count value of the pulse signals SO reaches 14, firstly, the film counter is counted up as shown in FIG. 3, and a value smaller by one than the film count value is displayed on the LCD as the number of film frames which can be photographed (Step 114). Incidentally, in this case the film count value becomes "1" and LCD display becomes "0" as shown in FIG. 4.

Next, the count value of the pulse signals SO is set at 4 and a predetermined overtime (1 sec.) is set (Step 116).

Then, the pulse signals SO generated due to the movement are counted (Step 118), and it is judged whether the count of the pulse signals SO is completed or not (whether the count value has reached 4 or not) (Step 120). When the count value does not reach 4, it is judged whether the overtime stands or not (Step 122), and, when the overtime stands, the routine returns to Step 118. When the count value reaches 4, the routine returns to Step 114, the film counter is counted up again, and a value smaller by one than the film count value is displayed on the LCD as the number of film frames.

While the routine is repeated from Step 114 to 112 as described above, the film is wound, simultaneously, the film counter is successively counted up and the value always smaller by one than the film count value is displayed on the LCD as the number of film frames.

On the other hand, the whole film in the patrone is wound up, the winding of the film becomes impossible, and, when the overtime is detected in Step 122, the motor 20C for the film delivery is stopped (Step 124) and the motor 20C for the film delivery is rotated in the reverse direction (direction of photographing) (Step 126).

Next, the count value of the pulse signals SO is set at 4 and a predetermined overtime is set (Step 128). Then, the pulse signals SO generated due to the rewinding of the film are counted (Step 130), and it is judged whether the count of the pulse signals SO is completed or not (whether the count value has reached 4 or not) (Step 132). When the count value does not reach 4, it is judged whether the overtime stands or not (Step 134), and, when the overtime does not stand, the routine returns to Step 130.

On the other hand, when the count value has reached 4, the motor 20C for the film delivery is stopped (Step 136), the film counter is counted down, and the count value as it is displayed on the LCD (Step 138).

That is, when the film count number is set at "N" at the time the whole film in the patrone is wound up as shown in FIG. 4, a value smaller by one than "N" i.e., "N−1" is displayed on the LCD. Thereafter, when one frame rewinding is performed, the film count value is counted down to "N−1" however "N−1" as it is displayed on the LCD, whereby the number of film frames displayed on the LCD during the preparatory winding processing accompanied by one frame rewinding does not subjected to the up-down fluctuations.

Next, another embodiment of the preparatory winding processing will be described.

Figure 5:
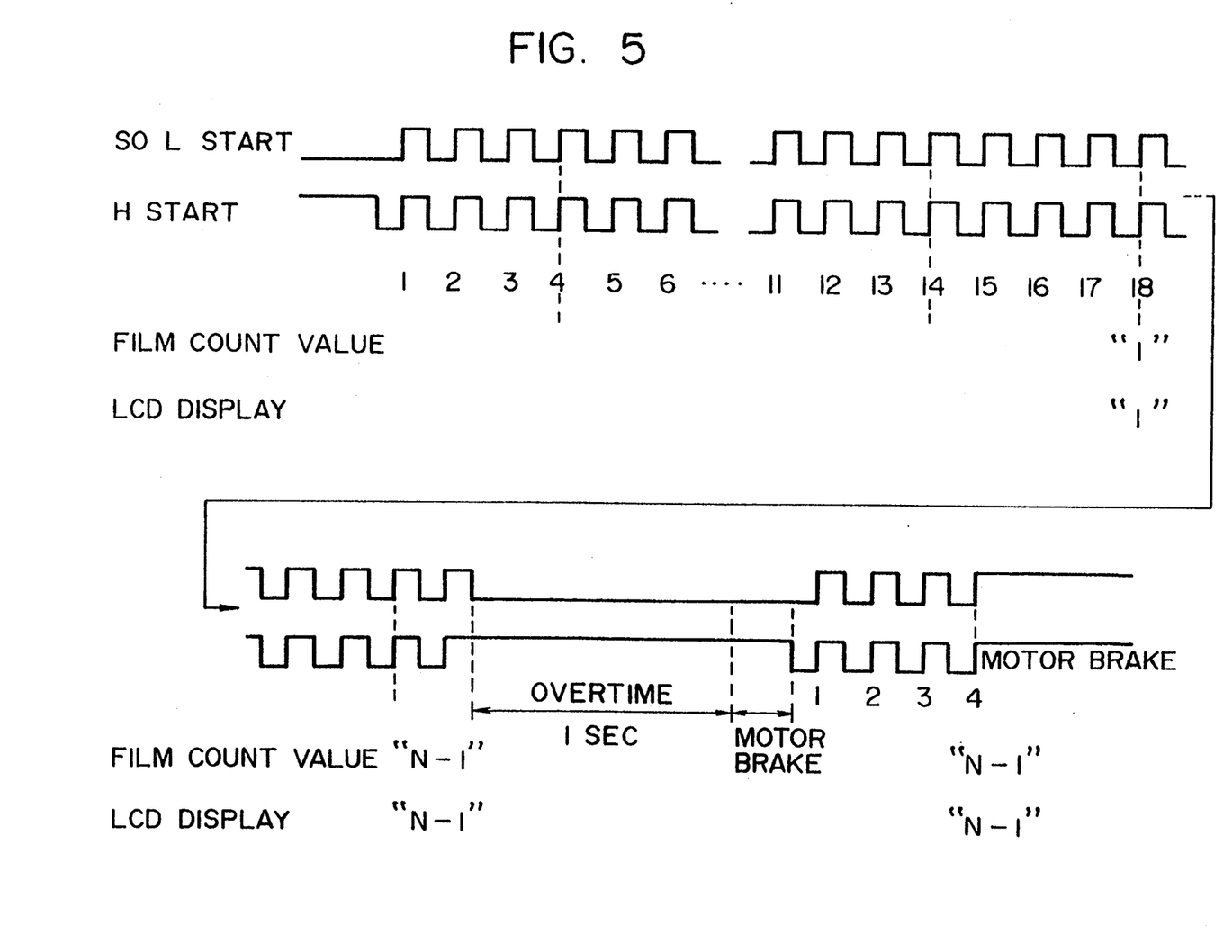
FIG. 5 is a view showing another embodiment of the relationship between the pulse signal SO, the film count value and the LCD display.

In this embodiment, as shown in FIG. 5, the film count value is set at a value smaller by one than that in the case of the preceding embodiment (Refer to FIG. 4), and the count value in the film counters as it is displayed on the LCD as the number of film frames which can be photographed. That is, the count value of the pulse signals SO in Step 102 of the flow chart shown in FIG. 2 is set at 18, and the count value as it is displayed as the LCD display in Step 114 of the flow chart shown in FIG. 3.

Thereafter, when one frame rewinding is performed, the film counter is prevented from being counted down. That is, Step 138 of the flow chart shown in FIG. 3 is omitted.

With this arrangement, the up-down fluctuations of the number of film frames displayed on the LCD during the preparatory winding processing accompanies by one frame rewinding are eliminated. Furthermore, since the film counter is previously set at a value smaller by one than the normal count value, the original count value is restored.

As has been described hereinabove, in the preparatory winding type camera according to the present invention, the number of film frames is displayed at a value smaller by one than the normal display at the time of winding during the preparatory winding processing, and the display of the number of film frames is not changed during the one frame rewinding after the whole film is wound up, so that the number of film frames can be displayed without the up-down fluctuation. With this arrangement, such a misunderstanding can be avoided that the number of film frames which can be photographed is decreased by one, and moreover, the same number of film frames as before can be secured.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. A preparatory winding type camera comprising:
   a film winding means for electrically winding a film from a patrone;
   a film rewinding means for electrically rewinding the film into the patrone;
   a film delivery control means for controlling the film winding means and the film rewinding means in such a manner that one frame is rewound after the whole film in the patrone is wound up during the preparatory winding processing and one frame is rewound each time a shutter release is performed after the completion of the preparatory winding;
   a film counter adapted to be counted up each time one frame is wound after the film in the patrone is wound by a photographing prohibiting region during the preparatory winding processing and to be counted down each time one frame is rewound;
   a display means for displaying the number of film frames on the basis of the count value in the film counter; and
   a control means for controlling the display means in such a manner that a value smaller by one than the count value is displayed as the number of film frames at the time of count-up in the film counter during the preparatory winding processing and the display of the number of film frames is maintained as it is at the time of rewinding by one frame during the preparatory processing.

2. A preparatory winding type camera comprising:
   a film winding means for electrically winding a film from a patrone;
   a film rewinding means for electrically rewinding the film into the patrone;
   a film delivery control means for controlling the film winding means and the film rewinding means in such a manner that one frame is rewound after the whole film in the patrone is wound up during the preparatory winding processing and one frame is rewound each time a shutter release is performed after the completion of the preparatory winding;
   a film counter adapted to be counted up each time one frame is wound after the film in the patrone is wound by one frame more than a photographing prohibiting region during the preparatory winding processing and to be counted down each time one frame is rewound;
   a display means for displaying the count value in the film counter as the number of film frames which can be photographed; and
   a control for controlling the film counter in such a manner that count-down in the film counter is prohibited only when one frame is rewound during the preparatory winding processing.

* * * * *